Figure 1:
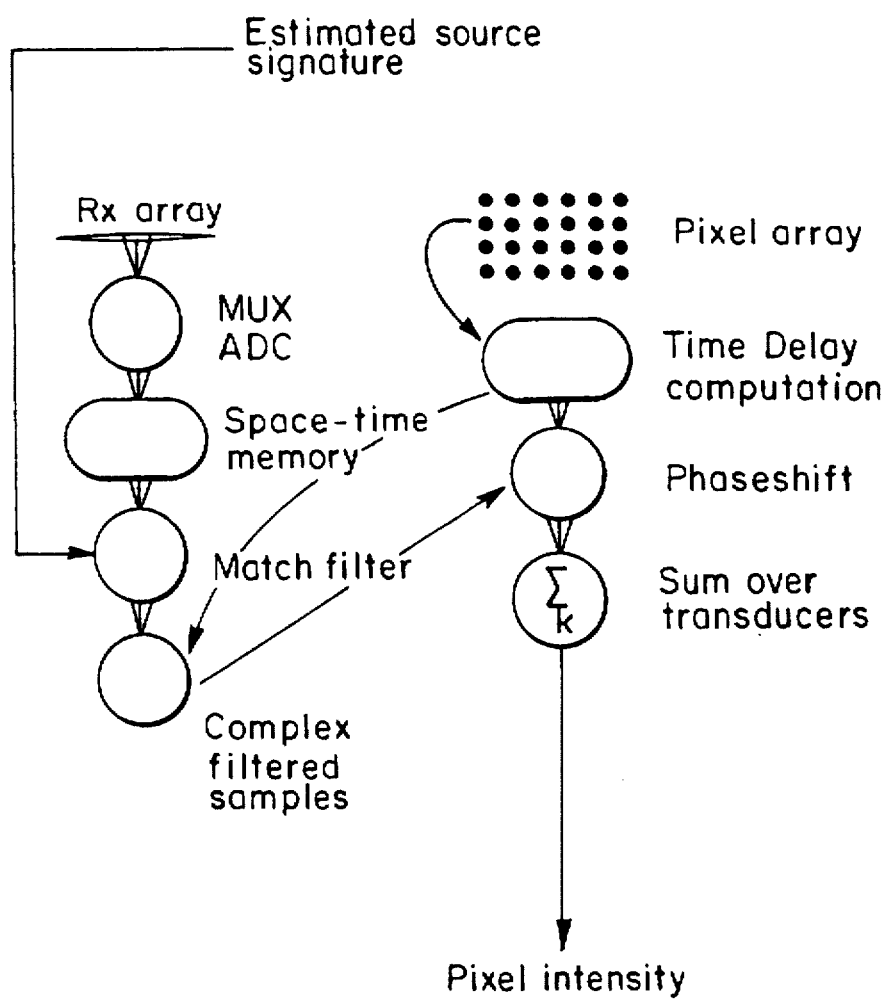

United States Patent [19]

Shippey

[11] Patent Number: 5,793,703
[45] Date of Patent: Aug. 11, 1998

[54] DIGITAL TIME-DELAY ACOUSTIC IMAGING

[75] Inventor: Geoffrey Arthur Shippey, Lerum, Sweden

[73] Assignee: Bofors Underwater Systems AB, Sweden

[21] Appl. No.: 714,054

[22] PCT Filed: Mar. 7, 1995

[86] PCT No.: PCT/GB95/00501

§ 371 Date: Nov. 12, 1996

§ 102(e) Date: Nov. 12, 1996

[87] PCT Pub. No.: WO95/24657

PCT Pub. Date: Sep. 14, 1995

[30] Foreign Application Priority Data

| Mar. 7, 1994 | [SE] | Sweden | 9400758 |
| Sep. 16, 1994 | [GB] | United Kingdom | 9418652 |
| Jan. 11, 1995 | [GB] | United Kingdom | 9500482 |

[51] Int. Cl.$^6$ .................................................. G01S 15/89
[52] U.S. Cl. ........................................ 367/88; 367/7
[58] Field of Search ............................ 367/88, 7; 342/25

[56] References Cited

U.S. PATENT DOCUMENTS

5,090,245  2/1992  Anderson ................................. 73/625

FOREIGN PATENT DOCUMENTS

2254149   9/1992   United Kingdom.
WO9200584 of 0000  WIPO.
WO92/00584 1/1992  WIPO.

OTHER PUBLICATIONS

"Digital Beam Forming for Sonar Systems", T.E. Curtis, M. Sc., Ph.D., and R.J. Ward, IEE Proc. vol. 127, Pt.F. No. 4, Aug. 1980.

Navigation Inaccuracies in Synthetic Aperture Sonar: Simulations and Experimental Set–Up, J. Chatillon, M.E. Zakharia, M.E. Bouhier.

"Extension of Synthetic Aperture Radar (SAR) Technique to Undersea Applications", Henry E. Lee, IEEE Journal on Oceanic Engineering, vol. OE–4, No. 2, Apr. 1979.

"A Real–Time Synthetic Aperture Digital Acoustic Imaging System", S. Bennett, D.K. Peterson, D. Corl, and G.S. Kino, Edward L. Ginzton Laboratory, Stanford U., Stanford, CA 94305.

Tutorial Review of Synthetic–Aperture Radar (SAR) with Applications to Imaging of the Ocean Surface, Kiyo Tomiyasu, Proceedings of the IEEE, vol. 66, No. 5, May 1978.

"Digital Synthetic Aperture Radar Technology", John C. Kirk, Jr., IEEE International Radar Conference, Raytheon Co., Electromagnetic Systems Division, Goleta, CA.

"Digital Time–Delay Beamforming With Interpolated Signals", S. Ries, Atlas Elektronik GmbH Sebaldsbrucker Heerstrasse 235, D–2800 Bremen, Germany.

"Shifted Sideband Beamformer", Roger G. Pridham and Ronald A. Mucci, IEEE Transactions on Acoustics, Speech, and Signal Processing, vol. ASSP–27, No. 6, Dec. 1979.

"Digital Interpolation Beamforming for Low–Pass and Bandpass Signals", Roger G. Pridham and Ronald A. Mucci, Proceedings of the IEEE, vol. 67, No. 6, Jun. 1979.

"Processing Directly Sampled Radar Data", W.M. Waters, G.J. Linde, B.R. Jarrett, and C.T. Lin, Naval Research Laboratory, Washington, D.C. 20375.

*Primary Examiner*—Daniel T. Pihulic
*Attorney, Agent, or Firm*—Lalos & Keegan

[57] ABSTRACT

This invention relates to improvements in or relating to digital time-delay acoustic imaging. According to the invention there is provided an acoustic imaging method for marine survey and other purposes comprising the steps of: insonifying a target area by periodic acoustic pulses; detecting reflections of said pulses by an array of at least two receiver transducers, which transducers generate respective output signals in response thereto, wherein further the signals are: sampled in time at a predetermined rate during an interval between said pulses; converted from analog to digital form; processed so as to generate a composite acoustic signal for each pixel in the insonified target area required to be imaged; and match-filtered with optimised filters in the frequency domain with an estimated source pulse signature.

26 Claims, 10 Drawing Sheets

Compressed Echoes from Point Target, Scaled by Signal/Noise Ratio.
(a) Hanning Envelope, Length = 65 Samples, 21 Spectral Components
(b) Optimised Envelope, Length = 49 Samples, 5 Spectral Components Length = 49
5 spectral comp.

Optimised Envelope (right half)

SYSTEM BLOCK DIAGRAM

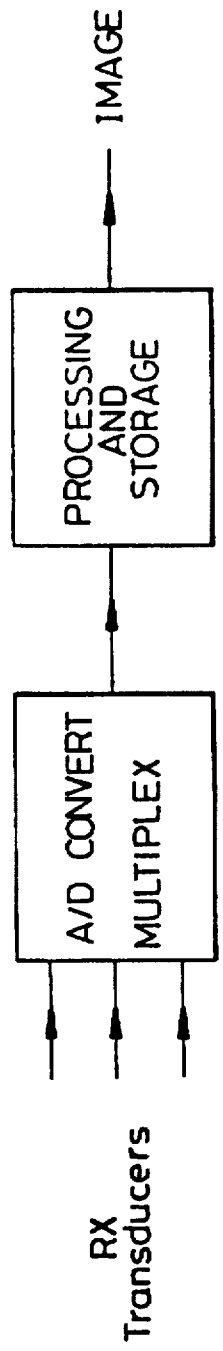
Fig. 6a COMMON PROCESSER AND STORAGE
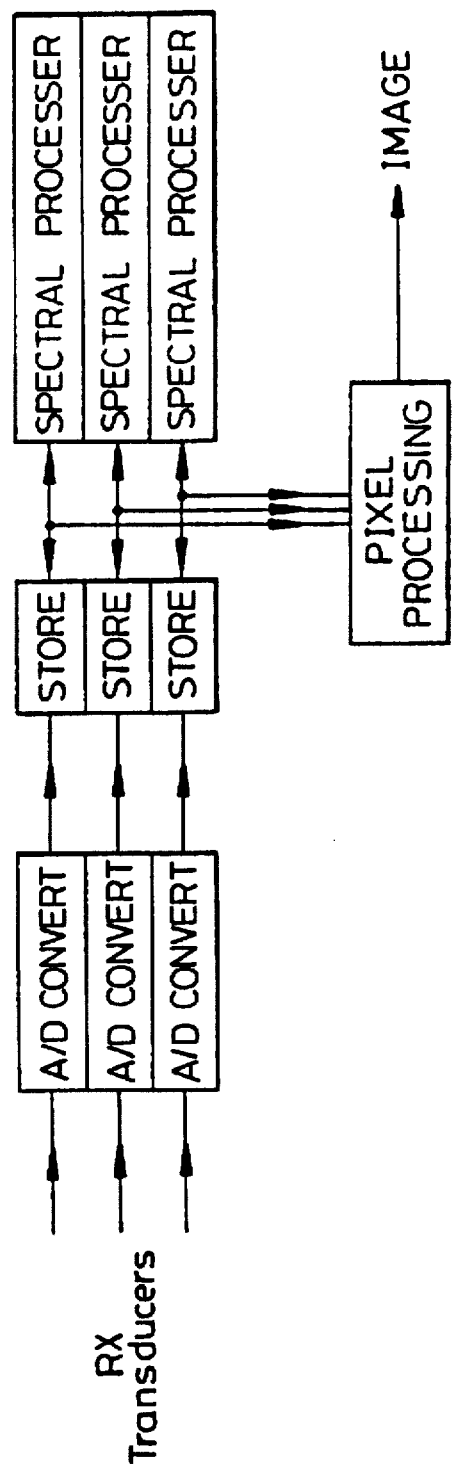
Fig. 6b PARALLEL PROCESSERS AND STORAGE

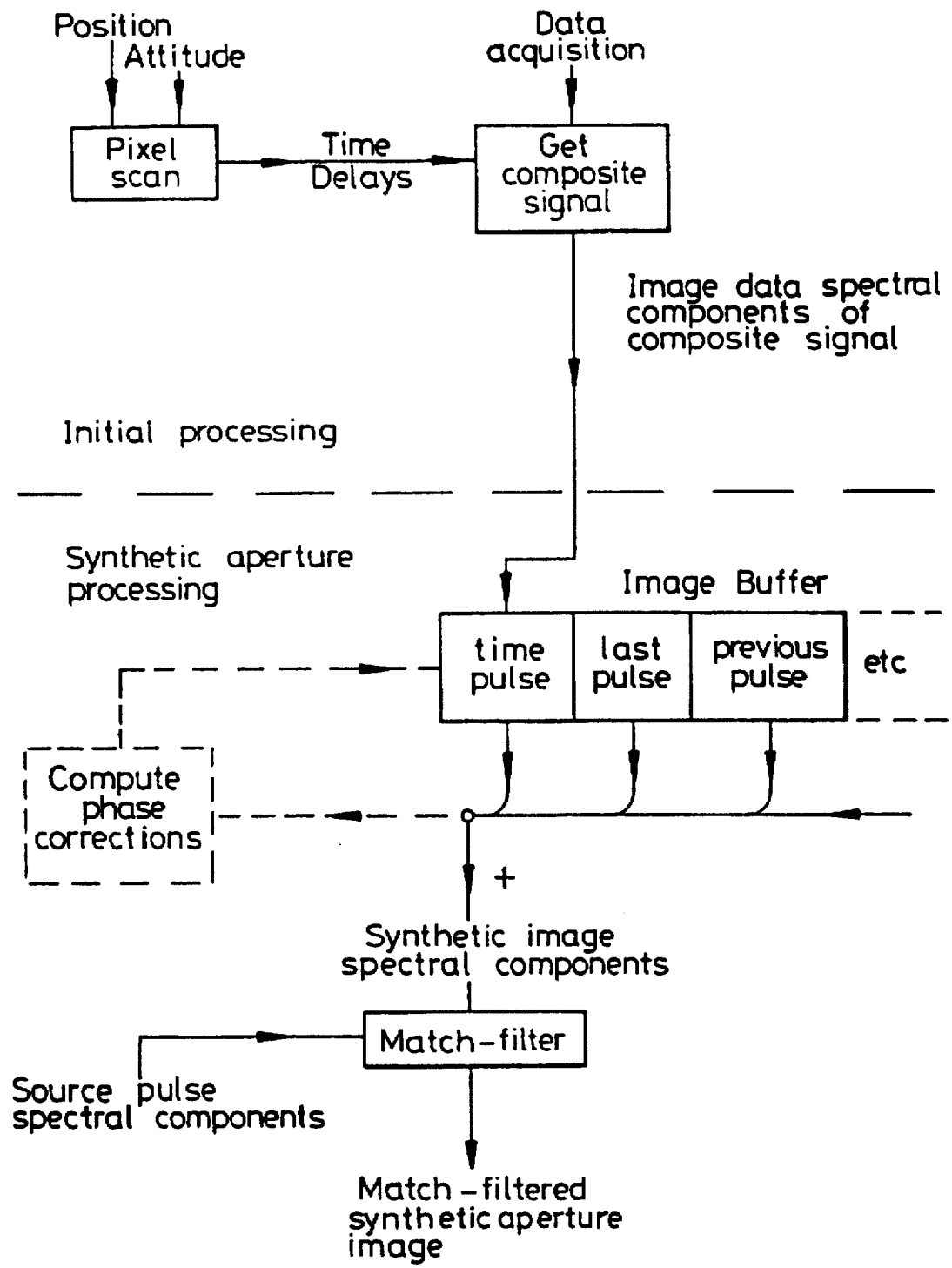
Fig. 7a  Synthetic aperture processing (options A)

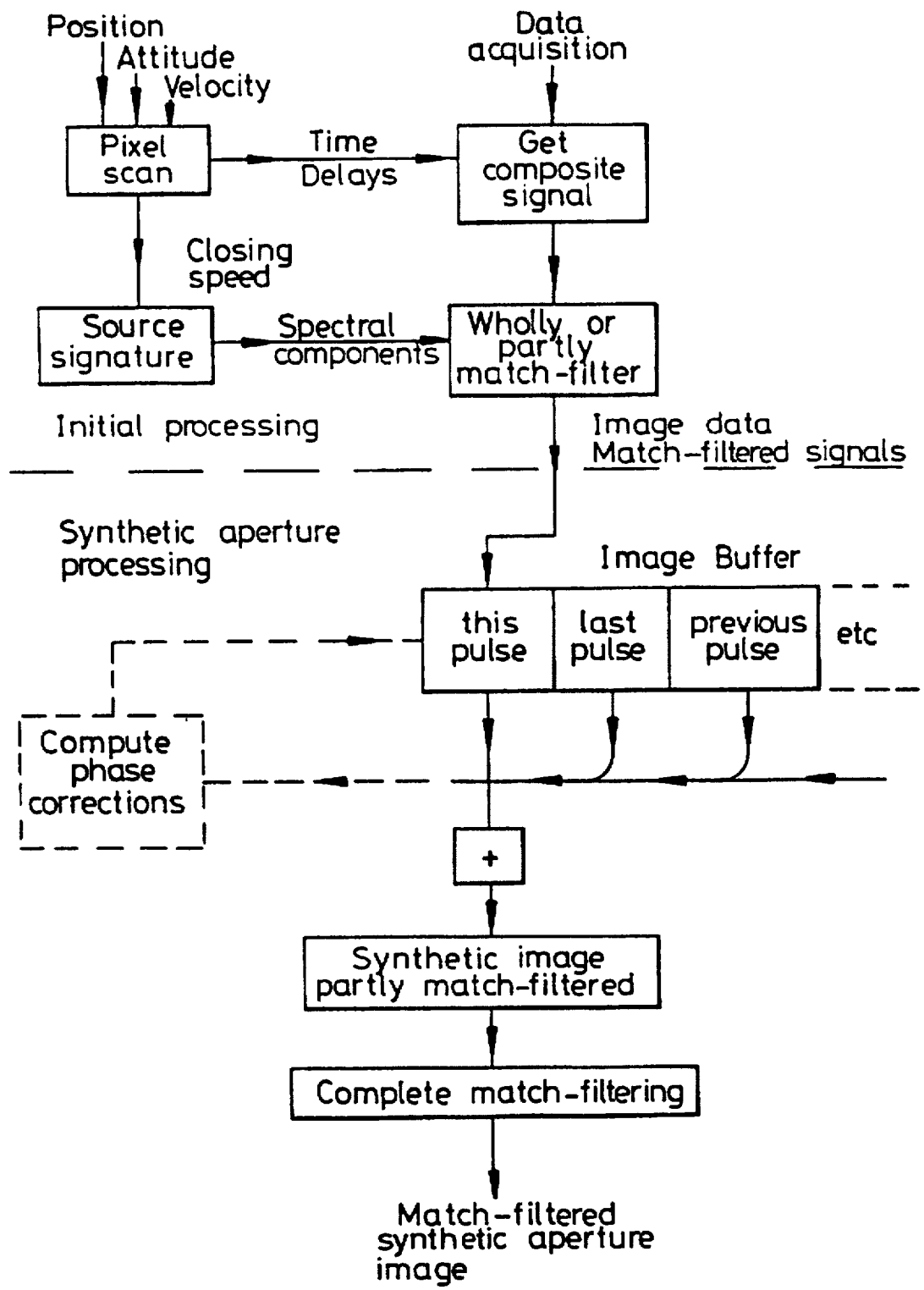
Fig. 7b Synthetic aperture processing (options B,C,D)

DIGITAL TIME-DELAY ACOUSTIC IMAGING

1. INTRODUCTION

This invention relates to improvements in or relating to digital time-delay acoustic imaging. The invention particularly, though not exclusively, relates to an acoustic method and apparatus intended for marine survey applications. The invention is also applicable to other applications of acoustic imaging.

2. PRIOR ART

2.1 GENERAL

The general approach to digital acoustic imaging given in the literature is to store the set of samples received from a 2D or 3D array of transducers in a "space-time memory". Processing of this data set should enable an image of the whole insonified area or volume to be reconstructed [1].

Time-delay beamforming is the most widely used analog technique, being robust and either narrowband or wideband. It can also be extended from beamforming to imaging in polar coordinates by using a large number of beams simultaneously, separated in angle by a few degrees. A digital version preserves these advantages, while adding some important new capabilities, particularly the ability to image in a Cartesian or other coordinate system, and the selection of the region of the scene to be imaged under computer control ("pan and zoom").

Conventional analog time-delay beamforming uses a fraction of the information received from an array of transducers to generate a line-scan of the scene in one particular direction. This direction is defined by a differential time delay, inserted between each pair of transducer echoes, before summation to form a composite signal with the required directivity. Time-delay imaging relies on fine compensation for phase-shifts between samples received at adjacent transducers. Hence a digital implementation requires either high sampling rates which is expensive both in digitizing hardware and computational load, or some method of interpolation between digital samples.

Two papers by Pridham and Mucci in 1979 [2,3] established powerful techniques for interpolating or "upsampling" a sequence of digital samples, and proposed specific beamforming procedures using interpolated sampled signals from a transducer array. These interpolation techniques are based on local spectral estimation of FFT components by quadrature filtering. A paper by Ries [4] reviewed various interpolation techniques including Pridham and Muccis' formulation. Ries gave an analytic solution for optimising the filter kernels, but did not discuss the possibility of avoiding explicit interpolation in the time domain.

2.2 THE INVENTOR AND OTHERS

In 1992, a Patent was applied for in the names of Shippey and McHugh [5]. The acoustic imaging method claimed there uses essentially the same phase-shifting technique as Pridham and Mucci, employing a set of adjacent digital filters spanning the signal bandwidth (quadrature comb filter) for local spectral estimation. However explicit interpolation in the time domain is avoided with consequent simplification in the computation.

This earlier Patent proposed a wideband version of the technique in which local spectral components of the composite echo are cross-multiplied by local spectral components of a frequency modulated source pulse to achieve pulse compression at little extra cost. However it gives no idea of how long the time window used in the comb filter for local spectral estimation should be, or the shape of the window function.

It turns out that the shape of the window function is extremely important for the success of match-filtered imaging. This window function determines the bandwidth of each spectral component used in the comb filter. Unless the bandwidth of the source signal is spanned uniformly by the spectral components of the comb filter, time-delay correction by phase-shifting the spectral components becomes inaccurate. The shape of the window function also determines the shape of the match-filtered output, for example the width of the peak, and discrimination against background noise. It is not at all obvious that the same window function can satisfy these different requirements simultaneously. In the present Patent Application a method of designing the window function is given for any kernel length. It turns out that the required shape is not standard, so the availability of at least one design technique is very important. Furthermore, using this design technique, good performance can be obtained with fewer spectral components, and much shorter kernel lengths than would be expected. If the bandwidth of the source signature is not too wide, even a single spectral component can give adequate performance. For the narrowband case, with a single carrier frequency, the invention enables shorter kernel lengths to be employed.

2.3 SYNTHETIC APERTURE ACOUSTIC IMAGING

Synthetic-aperture-radar (SAR) imaging, is mature technology, and the literature goes back many years [6,7]. There are also papers on synthetic-aperture imaging for nondestrucive testing applications, eg [8]. There are also early papers on synthetic-aperture imaging through water, ie Synthetic-Aperture Sonar (SAS) [9], based on similar principles to SAR. However the technology is much more difficult for two reasons:

a) perturbations in the movement of the acoustic platform through the water medium, compared with the very stable movement of an earth satellite in space.

b) perturbations in the propagation of acoustic waves through the water medium due to currents and thermal effects, which are larger than the corresponding perturbations for propagation of electromagnetic waves in air.

There have been recent studies on the effect of platform positioning errors on SAS imaging resolution, eg [10]. A method of compensating for these errors would make SAS more feasible, and a method of doing this will be given in this Application.

3. OBJECTS OF INVENTION

An object of the invention is to obviate or mitigate disadvantages/problems in the prior art.

Other objects of the invention include: to reduce the computation required for digital acoustic image reconstruction, and to improve the resolution of the reconstructed image. The invention has two aspects:

4. SUMMARY OF THE INVENTION
ASPECT A: OPTIMISED MATCH-FILTERED IMAGING

A first aspect of the invention offers a computationally efficient method of digital acoustic imaging, in which match-filtering is obtained at minimal additional computing cost by proper design of the window function used for local spectral estimation. If the source signal is frequency-modulated, a so-called "chirp" source, then match-filtering provides the pulse-compression required using such a source.

ASPECT B: IMPROVEMENTS TO SYNTHETIC-APERTURE SONAR

A second aspect of the invention extends the basic method of generating the composite signal for both narrowband and wideband echoes from real to synthetic apertures, and provides an automatic method for correcting for uncertainty in platform position, and the phase of the transmitted pulse.

Although the invention is described in terms of digital hydroacoustic (sonar) imaging, either aspect could conceptually be applied to NDT (non-destructive industrial testing of materials) or medical ultrasonic imaging.

The use of an optimised envelope design for Aspect A of the Invention applies to match-filtering of acoustic or radar echoes generated in any manner whatever provided that these echoes can be converted to sampled digital data.

4A. A SUMMARY OF ASPECT A OF INVENTION: EFFICIENT MATCH-FILTERED IMAGING (FIG. 1)

4A.1 SYSTEM OUTLINE

There is provided an acoustic image method for marine survey and other purposes wherein a target area is insonified by periodic acoustic pulses, for example "chirp" (swept-frequency) pulses. Reflections of said pulses are detected by a receiver array of at least two transducers which generate output signals in response thereto. These signals are:

a) sampled in time at a predetermined rate during the interval between said transmitted pulses, b) digitized by some known form of analog-to-digital conversion equipment, c) filtered by one or more complex kernels forming a quadrature comb filter spanning the signal bandwidth to generate a sequence of local in-phase and quadrature frequency components, such kernel or kernels having been selected or optimised as defined in Section 4A.4, d) processed by means of taking the weighted sum of selected phase-shifted filter signals to form the complex composite signal for each pixel in the insonified area which requires to be imaged, e) if more than one complex kernel is used in step c) the signals are further match-filtered in the frequency domain with the frequency components of the estimated source signature found by filtering the source signature with the same kernel used in step c), f) the magnitude of the complex signal for each pixel is formed by squaring and adding the real and imaginary parts of the complex composite signal given by step d or step e.

The invention further provides an apparatus for use in an acoustic imaging system as defined above.

It may be convenient to store digitised samples from step (b) in digital computer memory prior to step (c), but this is not a necessary feature of the invention.

The more detailed description below will be simplified by assuming that Doppler shifting of the acoustic echo due to differential motion of the target area and the transducers is negligible. The modifications necessary to handle Doppler shifting for a real aperture will be given in Section 4B.4 and for a synthetic aperture in 4A.5.

4A.2 GENERATING THE COMPOSITE ECHO (STEP d)

This step is executed as follows for a 2D or 3D image: for each pixel in the required image, i) a corresponding set of quadrature filtered samples is selected for each transducer, the echo time for the centre sample of the set being closest to the estimated time of flight of a transmitted pulse to the point in the insonified area corresponding to the pixel and back to the particular transducer in the array, ii) each pair of local in-phase and quadrature components is phase-shifted to correct for any difference between the required time delay and the time delay for the selected filtered sample, where the phase-shift is computed using the centre frequency of the quadrature filter which has been used, iii) the in-phase and quadrature frequency components of the composite signal are formed as the weighted sum of phase-shifted in-phase and quadrature components for each transducer.

Step d is defined mathematically in Equations A1,A1a, A2,A2a,A3 of Appendix A.

4A.3 MATCH-FILTERING OF COMPOSITE ECHOES (STEP e)

This match-filter step is executed by:

(i) extracting one or more corresponding spectral components of the source signature, using the same digital comb filter used for Step b;

ii) complex multiplication of the above spectral components of the source signature by the spectral components of the composite echo signal, to generate the complex matched filtered signal in accordance with (A4–9), and (A11) of Appendix A;

iii) addition of the above in-phase and quadrature spectral components to generate the in-phase and quadrature components of the complex envelope;

iv) determination of the magnitude of the complex envelope by squaring and adding the in-phase and quadrature components of the complex match-filtered signal in accordance with (A10).

If the source signature is stable from pulse to pulse, then Step d(i) can be carried out in advance, and need not be repeated for each pulse or "ping".

4A.4 OPTIMISATION OF WINDOW FUNCTION

4A.4.1 Methodology

A standard comb filter for local spectral estimation is the local FFT with a standard window function such as the Hanning Window. Using such a comb filter for pulse compression, the kernel length should be at least equal to the length of the transmitted pulse for good compression. The number of FFT components required to span the signal bandwidth increases with the number of samples contained in the pulse length.

This aspect of the invention is the use of shorter kernel lengths than the pulse length, and a subset of at least one Fourier spectral component by using an optimised window function. This reduces the computing load in steps c(ii) and c(iii) above proportionately.

It is not obvious that window functions can be found which simultaneously provide good time compensation in step c(iii) and good pulse compression in step (d). It is also not obvious that an optimisation technique can be found which will give good window functions. However for given source signature, sampling interval, kernel length L, and choice of spectral subset, an optimised window function $\{w_i\}$ is found by the iterative technique outlined below, which minimises the error function $Err$, defined below, and more formally in Appendix B:

The Phase Error $Err_p$ is defined as the standard deviation of time-displaced and time-compensated pulse-compressed echoes of the source signal from each other using the algorithm of Appendix A, estimated for a range of sub-sample time displacements, and normalised appropriately.

The Shape Error $Err_s$ is defined as the standard deviation of the complex envelope of the same output signal from an ideal response, which is the complex envelope of the match-filtered source signature, normalised appropriately.

Let C be the compression ratio, defined as the peak signal to rms noise ratio after match-filtering, divided by the peak signal to rms noise ratio before match-filtering. Define $C_0$ as the compression ratio obtained using timedomain match-filtering. Then if C is the compression ratio obtained using frequency-domain match-filtering as in steps c,d above we can define an error function $Err_r$ proportional to $\log(C/C_0)$.

The Error Function which is minimised by mathematical optimisation of the envelope is a weighted function of $Err_p, Err_s, Err_c$ and possibly other errors, eg $$Err_r = u_p Err_p + u_s Err_s + u_c Err_c$$

where $u_p, u_s, u_c \ldots$ are weights chosen in accordance with the operational importance of the individual errors.

One method of envelope optimisation is to use the following iterative procedure:

i) iteration begins using a standard window function of length L such as the Hanning window;

ii) at each iteration step, the change $e_i$ in $Err_r$ is estimated for equal small changes in each envelope coefficient $w_i$;

iii) a change in the whole set of envelope coefficients $\{w_i\}$ is made in proportion to the set $\{e_i\}$;

iv) the iteration process can be stopped when the change in the envelope at each iteration becomes negligible.

After optimisation, it is possible to assess the performance in terms of:

time-compensation, sensitivity to noise, peak width of compressed pulse, secondary peak levels, etc.

Hence it is straightforward to estimate the minimum acceptable kernel length, and in the wideband case the minimum number of spectral components for particular operational situation.

4A.4.2 Results of using the optimised window function

Figure 2A:
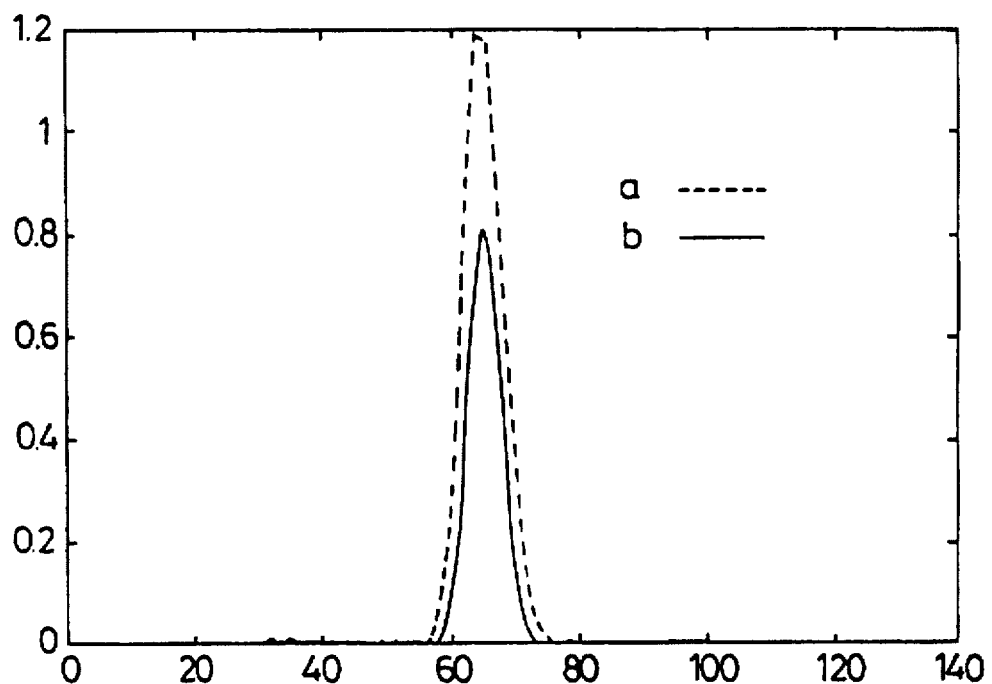
Figure 2B:
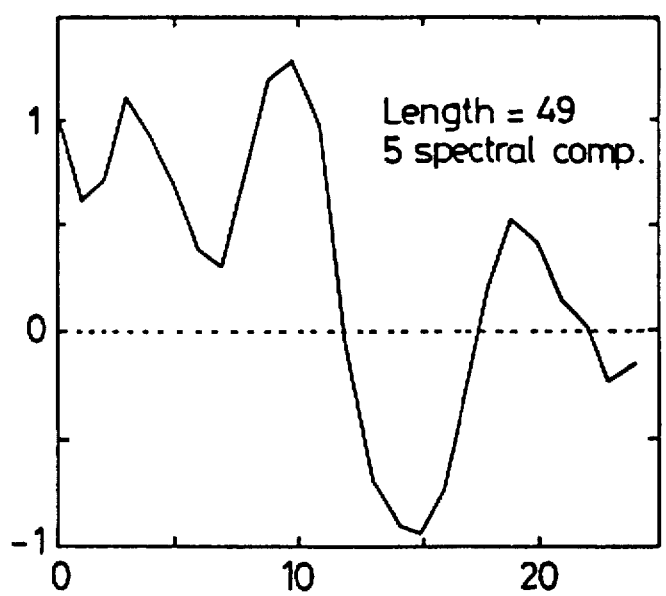

FIG. 2A, 2B gives the component pulse shapes and the optimised envelope (right-hand side) for the following situation:

Source signature:
  chirp from 0.1–0.4 normalised by sampling frequency
pulse envelope: Hanning
pulse length: 65 samples.

a) Hanning envelope, 65 samples, 21 spectral components.

b) Optimised envelope, 49 samples, 5 spectral components.

The compressed pulse amplitude is reduced in proportion to the Compression Loss. In this example, the Shape error is marginal and the Phase Error is negligible for the optimised window.

Figure 3A:
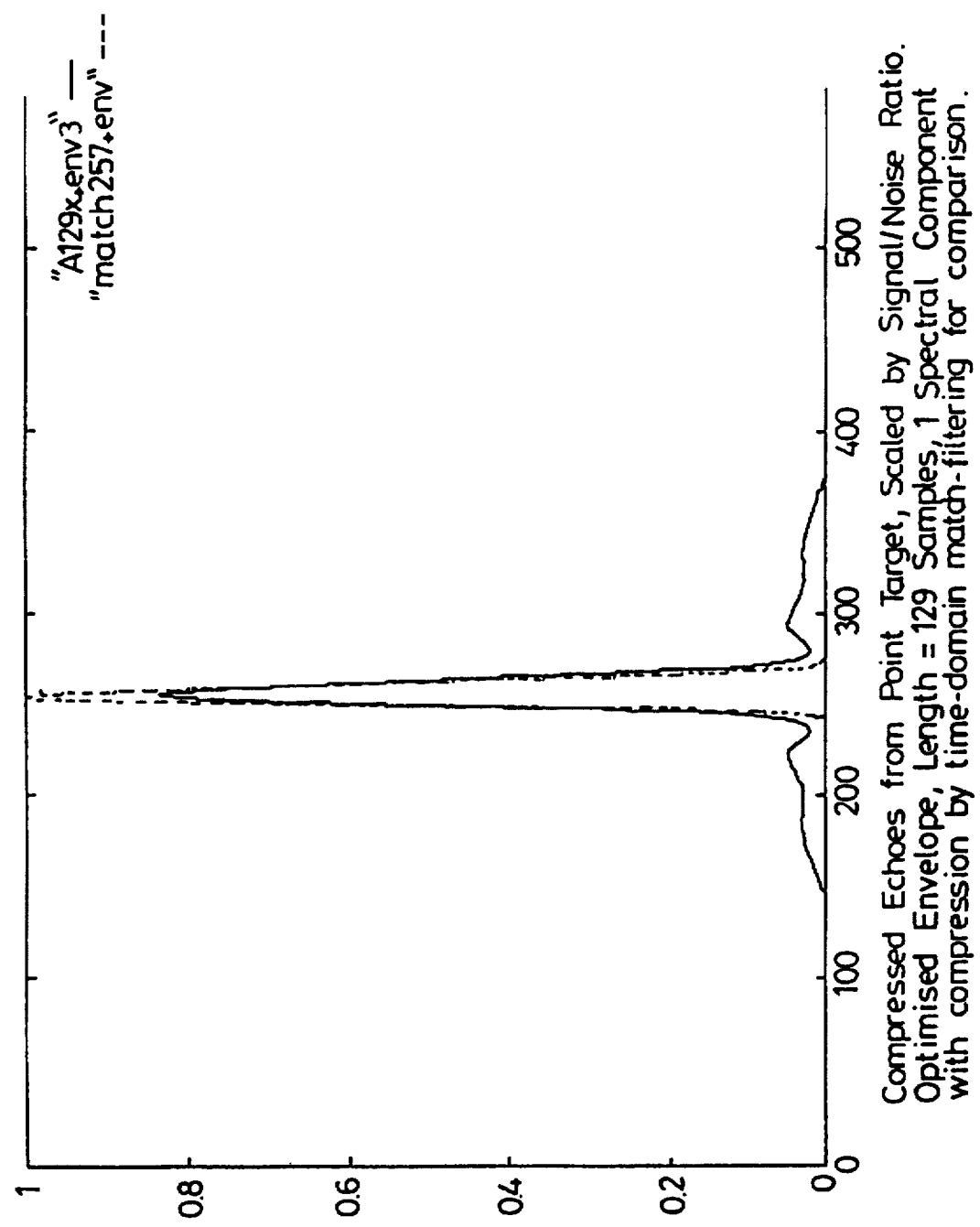

In another test, with the following parameters:
Source signature:
  chirp from 0.3–0.45 normalised frequency
pulse length: 129 samples a) Optimised envelope, 129 samples, 1 spectral components, b) Optimised envelope, 129 samples, 3 spectral components, FIG. 3A shows the compressed pulse using only one component and FIG. 3B with three components. The compressed pulse using time-delay match filtering is shown on both graphs for comparison. FIG. 3C shows the two optimised envelopes. Stray signal outside the main peak is noticable in FIG. 3A but still acceptable for most purposes. This stray signal is eliminated in FIG. 3B at the expence of Compression Loss. Phase errors are again negligible, giving almost perfect time-delay imaging.

4A.4.3 Single Frequency Component in Step (c)

Using a single frequency component, the entire pulse compression is carried out in the quadrature filtering stage (c). The optimised kernel envelope shown in FIG. 3C is approximately the original chirp pulse demodulated from its mid-frequency to base-band, so the spectrum of the modulated filter is very similar to the spectrum of the original chirp pulse. In fact it is possible to quadrature match-filter directly in step c instead, possibly using a truncated source pulse to reduce computation. The match-filtered signal is almost identical to the compressed pulse envelope modulated by the cos and sin of the mid-frequency, so phase shifting is as good an approximation to time delay as when using the optimised envelope.

However caution is necessary. The more general comb kernel optimisation procedure described in 4A.4.2 can be carried out using source signatures where a single quadrature kernel solution is unsatisfactory, so the method remains valuable.

4A.5 SIGNIFICANT DOPPLER SHIFT DUE TO MOTION 4A.5.1 Introduction

This is the situation where there is a significant closing velocity of the transducer array with respect to all or part of the target region. Closing velocity due to motion of the transducer array can be estimated from standard instrumentation, for example standard navigation instrumentation in the case of a transducer array mounted on the hull of a vessel. Closing velocity due to motion of a discrete target can be detected by spectral analysis of the echo itself.

The closing velocity has two effects:

it modifies the times of flight used in step c(i) above it modifies the spectral components of the echo from the region in space corresponding to each pixel in the image by the Doppler Shift for echoes from that direction.

4A.5.2 Correction to time delay

The two-way delay time for a particular pixel and a particular transducer can be expressed as the sum of two components:

the delay time to some reference point on the array;

the differential delay time to the particular transducer.

Provided that the array is not rotating rapidly in space, the differential delay times are negligibly affected by Doppler shift, and only the delay time to the reference point is affected. This delay time is nominally twice the spatial separation of the reference point on the array from the pixel centre in space, divided by the speed of sound in the medium. Doppler shift is corrected for by subtracting the closing velocity from this speed.

4A.5.3 Correction to Complex Filters

The set of spectral filters used must be modified to span the echo bandwidth as modified by Doppler shift. This modification could mean shifting centre frequency (frequencies), adding one or more spectral components, etc.

Similarly it may be necessary to allow for Doppler Shift in the copy of the source pulse used for match filtering. If the selected quadrature filter in step (c) is the match filter, then the pulse should be compressed or extended in the time domain before sampling to generate the kernel. If a complex comb filter is used, then the pulse should be compressed or extended in the time domain before sampling and applying the comb filter in step (e).

If the expected Doppler shift is dependent on the pixel being imaged, then several sets of source pulse spectral components are required for step d(i), spanning the range of Doppler shifts which can be expected.

If the source pulse is stable from pulse to pulse, these direction-dependant frequency components can be stored from pulse to pulse, and need only be recomputed if the speed of motion changes significantly.

4B SUMMARY OF ASPECT B OF INVENTION: EXTENSION TO SYNTHETIC-APERTURE IMAGING

4B.1 INTRODUCTION

The new method of synthetic-aperture acoustic imaging relies on the possibility of computing time-delays from pixels located in a coordinate system fixed in space to both the source and receiver transducers of a moving acoustic platform. This acoustic platform could be:

i) a vehicle moving through a water medium for hydroacoustic applications;

ii) a hand or machine-held ultrasonic transducer configuration for medical ultrasonic or non-destructive testing;

The method of generating the required time delays depends on application. Section 4B.2 presents possible methods for use in hydroacoustic applications.

If synthetic-aperture imaging is used, the minimum number of receiver transducers in Sec. 4A.1 is reduced to one.

4B.2 ESTIMATION OF TIME DELAYS FOR IMAGING IN A STABILIZED COORDINATE SYSTEM

4B.2.1 Positioning system

There is provided a positioning system such as GPS which directly or indirectly enables the position of some reference point on the acoustic platform, conveniently chosen to be the effective origin of the source pulse, to be located in the required spatial coordinate system. There may also be provided an additional positioning system, such as a conventional echo-sounder, which gives the height of the acoustic platform above the seabed surface immediately below it.

4B.2.2 Attitude Measuring System

There is provided an attitude measuring system, eg gyroscope and compass, which directly or indirectly enables each transducer of the receiver array to be located in space with respect to the said reference point.

4B.2.3 Basic Computation

Let the required image frame of reference be a 3D volume fixed in space, or a 2D slice of the water volume, aligned with the required ground coordinate system. Then the time delays from each 3D pixel (voxel) to each transducer can be found as follows:

i) by a standard mathematical procedure, the location of each required pixel in space is converted to a location in a coordinate system fixed to the acoustic platform, with the reference point as origin, using the position and attitude information available from 4B.2.1, 4B.2.2.

ii) The distance from each required pixel to the origin is then given by Pythagoras equation. This can be converted to time by dividing by the estimated speed of sound in the medium.

iii) The differential distance to each receiver transducer, and hence the differential acoustic travel time for a wave originating from the pixel is also given by standard geometry.

In the computation c(iii) of 4A.2, these differential delays are required with great accuracy in order to image the composite signal correctly for each pixel. The time delay to the reference point, which is considerably larger, is required with lower accuracy. Hence the above procedure has important advantages. A useful approximate computation of time-delays is given in Appendix B.

4B.2.4 Time-delays to Seabed

Let the required image be a 2D area of the seabed defined in the required spatial coordinate system. Then the above procedure must be modified in order to locate the seabed surface in the vertical direction. This can be done in different ways depending on the operational situation, for example:

i) the seabed is assumed to be locally flat and horizontal.

Then all pixels of the seabed surface can be assumed to lie in a plane, in which the vertical distance below the platform is known from 5.2.1 ii) the acoustic aperture containing the set of receiver transducers has extension in the vertical or Z direction; for example it may consist of two linear rows of transducers, one above the other separated by the mid-value of the acoustic wavelength. Then for each (X,Y) pixel on the seabed, it is possible to estimate time delays for a range of Z values, and select the Z value giving the greatest amplitude for the pixel.

4B.3 SYNTHETIC APERTURE TECHNIQUE

4B.3.1 Introduction

The methodology will first be described for a simplified situation (FIG. 3) in which just two narrowband source pulses are emitted, and two successive sets of echoes are received as the acoustic platform moves horizontally, parallel to the real array aperture. Then we obtain a synthetic receiver aperture which is the combined extent of the two real receiver apertures. Too large a movement between successive pings produces a gap in the synthetic aperture, giving the same side-lobe problems as a gap in a real receiver aperture, but this is a detail engineering design question.

We consider the imaging of one particular pixel located in space, which is insonified from both positions of the acoustic platform.

The further simplification is made that the transmitted source pulse from the second location is a precise copy of the source pulse transmitted from the first location.

The further assumption is made that at the acoustic frequencies used, the echo time for a signal to and from the specified location in space is predictable to within a small fraction of the acoustic wavelength.

The initial description of the method is simplified by considering a single quadrature kernel. Then the composite signal is required only for the carrier (mid) frequency.

4B.3.2 Methodology (Single Quadrature Filter in Step d)

Suppose first that only one quadrature filter, for example the match filter, is used in step d of section 4A.2 above, so step e is not required. For each location of the array, the in-phase and quadrature components of the composite echo at each pixel, given by step d are combined to give the synthetic aperture complex composite echo for that pixel. The echo magnitude for the pixel is then formed by carrying out step (f).

The estimated time delays must be accurate, and the conditions of 4B.3.1 fulfilled. Also the average should be restricted to pixels which are actually insonified for each platform position.

Alternatively "phase-independent SAS" processing can be realised by taking the magnitude using step f before combining. Under ideal conditions, the resolution of phase-dependent SAS is superior, but the technique is more sensitive to errors in platform positioning and inhomegenities in the medium. Under certain conditions, phase-independent SAS may produce better imagery.

The same principle can be extended directly to three or more successive positions of the array, with a correspondingly longer synthetic aperture. For continuous synthetic-aperture imaging, the outputs for pixels in successive images can be placed in storage, and combined to give the synthetic aperture image. This combination may be a straight averaging operation, or a weighting factor can be introduced as with physical array shading.

4B.3.3 SAS Methodolocy (Oaudrature Comb Filter in Step d)

Figure 4:
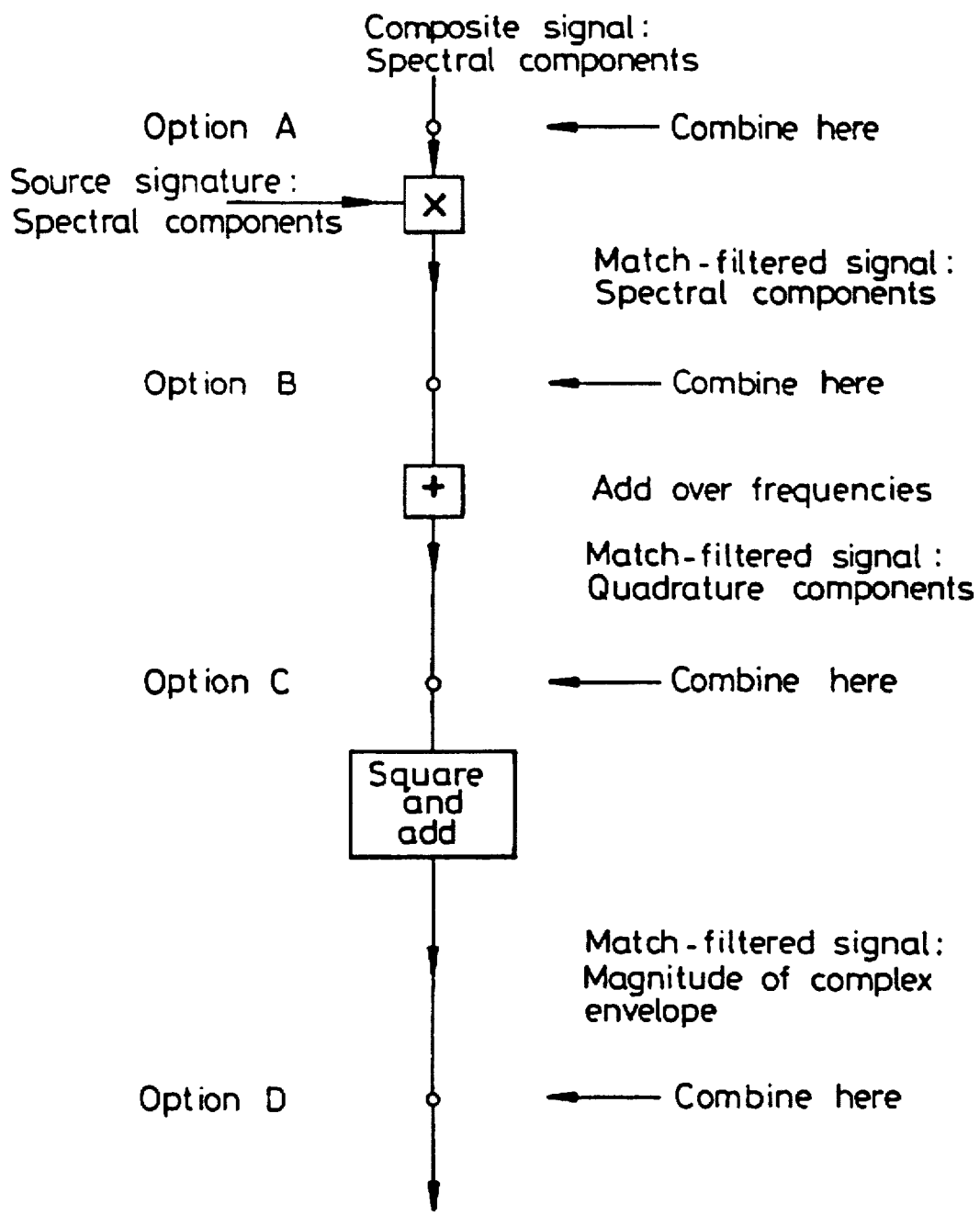

The same conditions apply as before. However, there are now more options in breaking the sequence of processing steps in order to average over a number of platform positions, before completing the sequence to form the synthetic image. Four possibilities are illustrated in FIG. 4;

A) combining the spectral components of the composite signals after step d;

B) combining the spectral components of the matchfiltered signals after step e(ii);

C) combining the in-phase and quadrature components of the complex envelope after step e(iii);

D) combining the magnitude of the complex envelope after step f.

4B.4 Correction for Certain Phase and Navigation Errors in Synthetic Aperture Processing 4B.4.1 Introduction The fact that physical aperture images are generated of the same scene from different platform positions opens up the possibility of direct compensation ("auto-focus") for a number of errors which affect SAS processing. In principle all the compensation methods outlined below rely on cross-correlating successive physical aperture images, either the complex image, or the magnitude image or both.

In order to determine compensation parameters, it is strictly unnecessary to cross-correlate all the pixel values which are available. For example, far range values are more sensitive to noise, and the dependance of near-field phase on platform position is more complicated. Hence a convenient subset of pixels present in two or more images is selected for comparison. In general, the accuracy of the estimate increases with the number of pixels in the subset.

4B4.2 Correction for Phase-Shift in the Source Pulse

We suppose we have subsets of two complex physical aperture images $I_1(ij)$, $I_2(i,j)$ which differ due to a phase change in the source pulse used to generate them. For a wideband chirp pulse we define the phase-shift in relation to the source pulse and its Hilbert Transform, so that if $S_1$, $S_2$ are the complex source pulses are used for quadrature match filtering , then $S_2 = \exp(i\phi)S_1$.

Then the phase of the complex cross-correlation coefficient $\Sigma \Sigma I_1(i,j)I_2^*(i,j)$ gives an estimate of the phase-shift $\phi$ to be corrected.

4B.4.3. Correction for Errors in Estimating the Position of the Array Reference Point Small unknown positioning errors ($d_x$, $d_y$, $d_z$) in locating the reference point of the array in space have a similar affect to phase errors in the source pulse. Then the region imaged for each pixel is almost unaffected by the error, but the errors in the computed time-delays destroy the constructive phase interference between images required for successful synthetic-aperture imaging. Even a large positioning error which is systematic from ping to ping does not affect the phase-coherence.

Provided the random errors are of the same order as the acoustic wavelength, they can be corrected in a similar manner to 4B.4.2. using the relationship between phase-shift and displacement $\phi = 2\pi d/\lambda$ where d is the displacement and $\lambda$ is the wavelength. For narrow-band signals $\lambda = \lambda_c$, the wavelength of the carrier frequency. For wideband imaging using a single frequency component $\lambda = \lambda_m$, the wavelength corresponding to the mid-frequency. Using a multiplicity of frequency components the operation needs to be carried out on an image generated using a selected frequency component, in which case $\lambda$ corresponds to the mid-frequency of the selected filter.

In order to determine the error due to a displacement in a given coordinate direction, suppose that the vector from the platform reference point to the pixel (i,j) in space has direction cosine $\alpha(i,j)$ with the coordinate axis, then the effective phase displacement is given by the phase of $\phi$ of the cross-correlation $\Sigma \Sigma \alpha_1(i,j)I_1(i,j)\alpha_2(i,j) \alpha I_2^*(ij)$ between the weighted images, whence $d = \phi/2\pi$.

There are other mathematically equivalent methods of exploiting the image complex cross-correlation function to give the same information, which may be preferably under different circumstances.

When the unknown displacement has been estimated, the position of the platform reference point in space is corrected, and composite signals for all pixels can be calculated or recalculated. The synthetic aperture calculation is then carried out as described earlier.

4B.5 IMAGE DEBLURRING

If the transmission of sound in the medium at the selected frequency range is such that there is no phase-coherence between successive echoes, then Option D, FIG. 3 D, can be used to generate an image averaged over a number of pulses. There are then available image enhancement techniques which rely on inverting for the point-spread function.

There is also disclosed herein:

a method of acoustic imaging as hereinbefore described or otherwise in which the set of time delays to the receiver transducers is compensated for motion of the insonifier and receiver transducers in such a way as to stabilize the set of image pixels in space and generate an image directly in a ground coordinate system.

In this case, additionally the repeated imaging of a subset of pixels of images derived from successive insonification pulses after lateral movement of the receiver array may be used to generate a synthetic-aperture image of such pixels.

Also in this case, additionally the repeated imaging of a subset of pixels in images derived from successive insonification pulses after movement of the receiver array in any direction may be used to increase the signal-to-noise ratio at such pixels, and hence generate image improved for standard deblurring processing.

5. LIST OF DRAWINGS

Figure 3B:
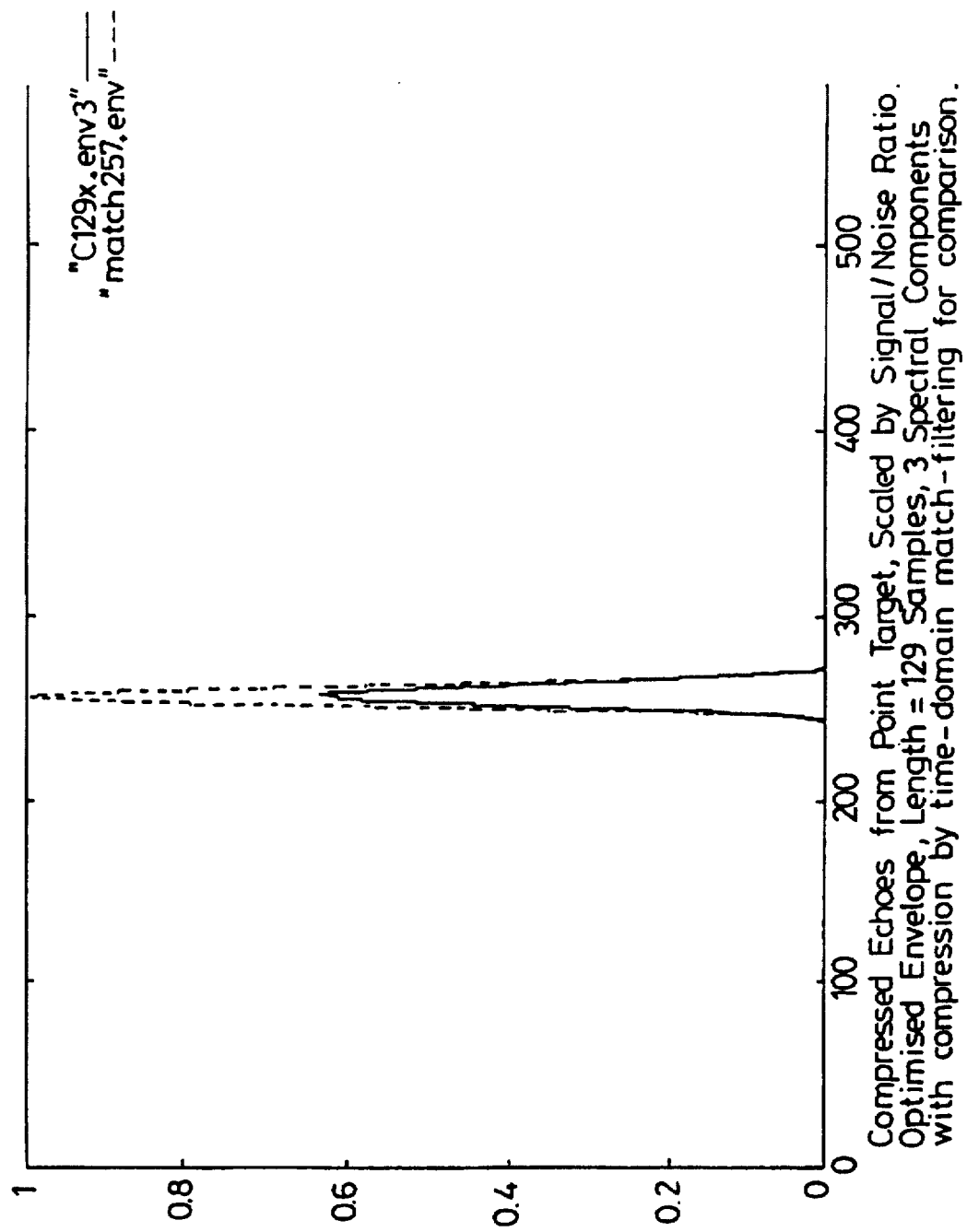
Figure 3C:
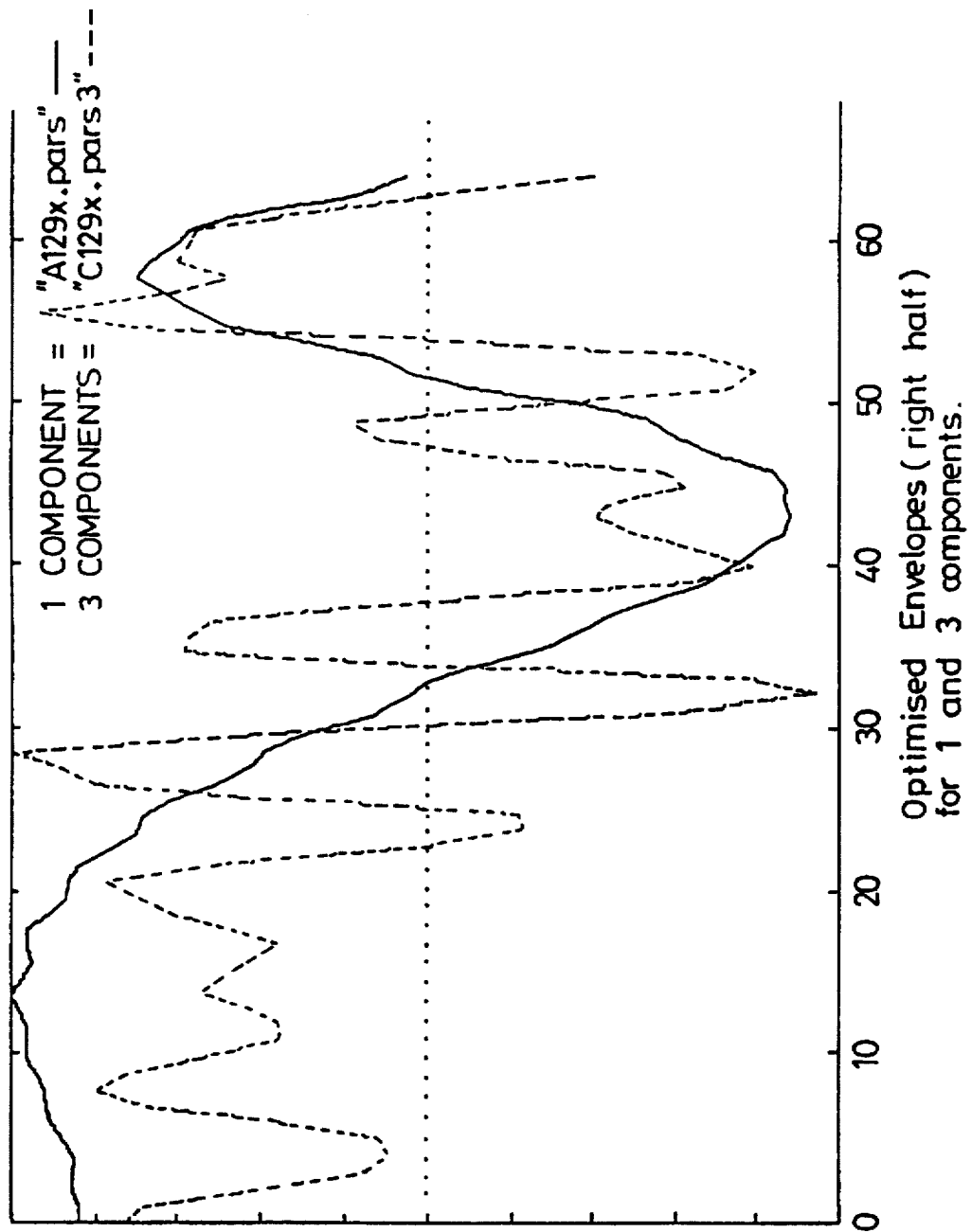
Figure 5:
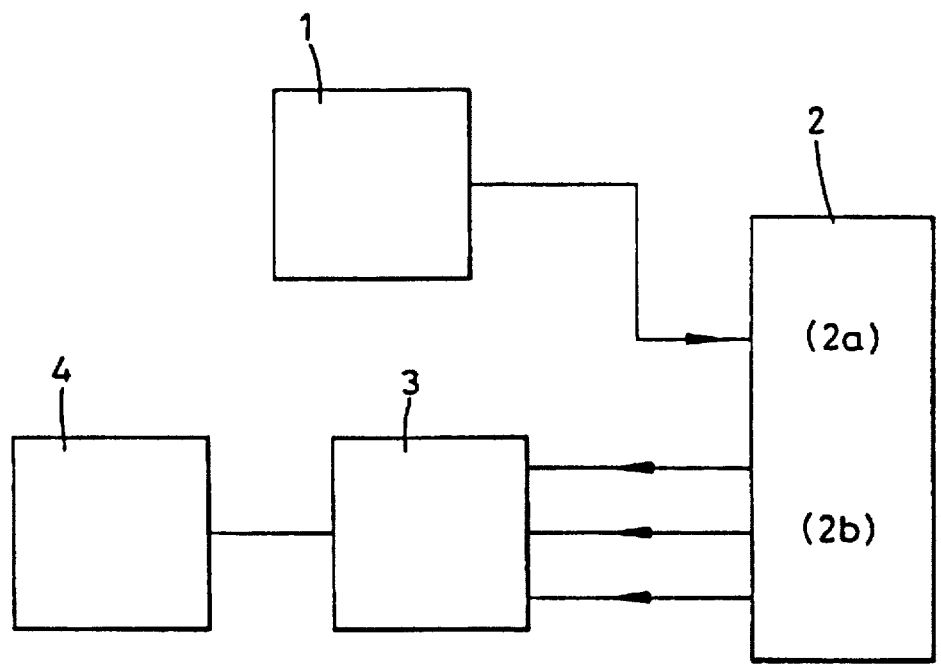

FIG. 1 Simplified schematic diagram showing basic processing with negligible Doppler Shift;

FIG. 2a Comparison of compressed output pulses using Hanning window and a shorter filter with fewer spectral components using an optimised window;

FIG. 2b Optimised envelope;

FIG. 3a Comparison of compressed output pulse using single spectral component and optimised window function, with match-filtered pulse;

FIG. 3b Similar comparison using three spectral components;

FIG. 3c Optimised window functions for one and three spectral components;

FIG. 4 Options for combining image data in synthetic aperture computation;

FIG. 5 System block diagram;

FIG. 6a,b Block diagram of processing arrangements;

FIG. 7a,b Block diagrams for synthetic aperture processing.

6. DESCRIPTION OF PREFERRED EMBODIMENTS 6.1 SYSTEM OVERVIEW

The overall system consists of four main modules:
a) Source Pulse Generation
b) Acoustic Projector and Receiver
c) Data Acquisition
d) Processing Position and attitude sensors for the Acoustic Projector and Receiver may be required to provide information to the Processing Module.

FIG. 5 is a block diagram illustrating the system. This consists of:

- a Pulse Transmitter 1 capable of generating repeated sonic or ultrasonic pulses with the required waveform.
- an Acoustic Projector and Receiver 2 capable of launching the required pulse in the required direction, and receiver echoes of this pulse from the required direction. Both projector and receiver consist of one or more transducers of conventional type. The same transducers may be used for both transmission and reception. Otherwise the module may be split mechanically into a Projector means 2a, and a Receiver means 2b.
- a Data Acquisition means 3 is adapted to amplify, digitize, and sample the signals received at the set of Receiver transducers.
- the Processing means 4 processes the samples generated by the Data Acquisition Means 3 to create the required image, and contains storage means as necessary for this computation.

The Source Pulse Generator 1 may be of conventional type and will not be described further herein.

6.2A ACOUSTIC PROJECTOR AND RECEIVER

This may take different forms depending on whether the application is ultrasonic imaging in air, or hydracoustic imaging at different frequencies.

The set or sets of one or more acoustic transducers used for transmission and reception may be organized in a one-dimensional array or a two-dimensional array, or may be incorporated in the outer surface of a ship's hull or underwater vessel. The number of receiver transducers is at least two, unless processing for synthetic-aperture imaging is carried out in means 4, when the number can be reduced to one.

The set of one or more transducers used for projection is required to insonify at least the region in space which is required to be imaged with each transmitted pulse. Power is conserved, and artefacts are reduced, if the projector array is designed to minimise the additional region insonified. The projector transducers may be arranged so as to project a narrow fan-beam in a plane so as to define an image area in the same plane.

The set of one or more transducers used for reception may be designed to select image points in two or three dimensions depending on the arrangement of transducers.

6.2B DATA ACQUISITION

The digitizer module contains means to access echoes received at each individual receiver transducer in means 2 above. It comprises:

a) a front-end amplifier for each transducer, which includes a filter to limit the frequency range of the echoes to the required frequency range, which is almost always the frequency range of the source pulse.

b) a sampling-digitizer unit consisting of one or more analog-to-digital conversion electronic circuits, which may also include further signal amplification as a function of echo time (time-varying-gain). The transducer signals may be multiplexed before or after digitization, or even processed separately in a parallel implementation of the Processing means 4.

6.3C MATCH-FILTER PROCESSING

FIG. 1 gives a general block diagram for the basic image generation computation. The processing in individual blocks varies in detail depending on the specific application but the framework remains the same. This schematic diagram does not include the additional processing required for synthetic-aperture imaging. An additional processing step involving a search in the vertical direction is required for bathymetric measurement.

The basic computation has already been given in Sections 4A.2, 4A.3 and is defined mathematically in Appendix A. The preferred embodiment is the use of a subset of Fourier components (Eq A1a,A2a, A11) in conjunction with an optimised window function designed as described in Section 4A.4. The length of the window depends on the pulse length and the shape of the pulse envelope. A safe value is the length containing 90% of the pulse energy, but shorter lengths can be used for short-range imaging where electronic noise is not a limitation. The number of spectral components can be as few as 5 with a frequency modulated source chirping over a 4:1 frequency range, and as few as 3 for a frequency-modulated source chirping over a 1.5:1 frequency range.

For a narrowband source with a single carrier frequency, only one spectral component equal to the carrier frequency is required.

The computation can be implemented in a wide variety of ways, ranging from FIG. 6a, in which all transducer samples are stored in one memory module, which is then accessed by a single processor unit, to FIG. 6b, in which each transducer has its own associated memory and processer for local spectral estimation, which is independent of the pixel being imaged. Additional processers are used for the pixel-dependant processing, viz. time-delay computation, generation of the composite signal, and match-filtering.

6.4 TIME-DELAY COMPUTATION

It may be convenient to generate the image in a coordinate system which moves with the Acoustic Transmitter and Receiver. In this case the time-delays for all pixels in the required image and all Receiver Transducers can be wholly or partly precomputed and stored in a Look-Up-Table. In other situations, and particularly for Synthetic-Aperture Imaging, the time delays must be computed for an image generated in a coordinate system stabilized in space. In that case the time-delays for all pixels in the image and all Receiver Transducers must be recomputed whenever the Acoustic Transmitter and Receiver has moved between pulses.

For most sonar applications, the Taylor Series approximation to the time-delay computation given in Appendix B is sufficiently accurate. The full geometrical computation may be required for medical ultrasonic and nondestructive testing applications when the range to the target area is similar to the dimensions of the acoustic aperture.

It should be noted that additional sensors are required to generate time-delays for a coordinate system stabilized in space, namely a positioning system, and an attitude measuring system. Additional sensors may also be used to estimate Doppler Shifting due to movement of the Transducer Array.

6.5 SYNTHETIC APERTURE PROCESSING

The processing sequence is illustrated in FIG. 7, where an additional step is added between generation of the composite signal for each pixel, and match filtering. This step is shown as carried out in a separate processing module, which is convenient although not necessary.

The image data handed over to the Synthetic Aperture Module consists of the composite signal for each pixel, namely the complex value for each spectral component used (Option A in Sec. 4B.3.2) or the partially or wholly processed match-filtered signals (Options B,C,D).

The Synthetic Aperture Module stores such images generated from the last n pings (where n depends on a number of factors including the transmitter beamwidth), and carries out any of the necessary computations given in Sec. 4B.3.3, 4B.3.4, 4B.3.6, 4B.3.7 to correct for phase-changes in the source signature, and errors in estimating the position of the acoustic platform reference point.

The last n sets of pixel values signals are then combined to give a combined image for the synthetic aperture, and match-filtering is completed as defined in Sec 4B.3.2.

7. CHIRP (SWEPT-FREQUENCY) AND OTHER SOURCES

In the case of a chirp (linear swept-frequency) source, and other sources with a balanced spectrum, it is possible to use direct quadrature match filtering in step (ii) of 4.A.2. The phase-shift used to compensate for a given small time-delay in step (iii) is computed for the centre frequency of the signal.

The method of step 4A.4 can be applied to generate optimum swept-frequency kernels which are shorter than the pulse length. Optimisation can also be used to generate a kernel giving a wider peak in the range response in order to image a large insonified area at lower resolution.

REFERENCES

2. "Digital interpolation beamforming for low-pass and band-pass signals": Pridham R. G. and Mucci R. A., Proc.IEEE, Vol 67, (June 1979) pp.904–919
3. "Shifted sideband beamformer": Pridham R. G. and Mucci R. A. IEEE Trans. om ASSP, Vol 27. (December 1979) pp.713–722
4. "Digital time-delay beamforming with interpolated signals": Ries S., Proc. European Conf. on Underwater Acoustics, Luxembourg, (September 1992) Ed. M. Weydart, Elsevier Applied Science 1992, pp.594–689
5. "Method and apparatus for acoustic holographic imaging in marine and other acoustic remote sensing equipment": Shippey G. A. and McHugh R. Int Patent Application WO 92/00584, 9th Jan. 1992.
6. "Digital Synthetic Aperture Radar Technology": Kirk J. C., IEEE Int. Radar Conf.(1975)
7. "Review of synthetic aperture radar", Proc. IEEE (May 1978) pp.563–583
8. "A real-time synthetic aperture digital acoustic imaging system": Bennet S., Peterson D. K., Corl D. and Kino G. S., Acoustic Imaging, Vol 10,pp.669–692, Plenum Press, N.Y. 1981
9. "Extension of synthetic aperture radar techniques for undersea applications": H. E. Lee., IEEE J. Oceanic Eng. Vol.oe-4 No.2 (April 1979) pp.60–64.
10. "Navigation inaccuracies in synthetic aperture sonar; simulations and experimental set-up": Chatillon J., Zacharia M. E. and Bouhier M. E., Undersea Defense Technology (UDT 92), london UK, (June 1992) pp.553–557

APPENDIX A: FORMULATION OF THE PULSE-COMPRESSION ALGORITHM

A1 Forming the Composite Signal from Sampled Data

Echoes are received at an array of K transducers, sampled at interval s, and stored in space-time memory. To form the composite signal, windows of length L samples are used to select sets from each transducer sequence, centred on the nearest sample to the required delay time for that transducer. These sets are Fourier transformed and any residual fractional time delay is corrected by phase shifting in the frequency domain. To simplify the notation, define the nearest sample to the required centre as $X_{k,O}$ in the sequence $\{X_{k,n}\}$ received at the k'th transducer. Fourier components are given by:

$$F_{k,r} = \sum_{i=-1/2L}^{1/2L-1} x_{k,i} w_i \exp(2\pi j \cdot ri/L) \tag{A1}$$

for $r = -\frac{1}{2}L \ldots \frac{1}{2}L-1$, where $\{w_i\}$ is some real-valued window function. Let the residual fractional time delay be $\tau_k$, where $|\tau_k| \leq \pm \frac{1}{2}s$. Then each frequency component can be phase-shifted, using:

$$F'_{k,r} = F_{k,r} \exp(2\pi j \cdot r\tau_k/L) \tag{A2}$$

In principle it is now possible to obtain the interpolated set of shifted samples by inverse Fourier transform of (A2), although this step is not required. The accuracy of interpolation would then be seen to depend on the choice of window function, $w_i$.

Fourier components of the composite signal are given by:

$$F_r = \sum_{k=1}^{K} F'_{k,r} = \sum_{k=1}^{K} F_{k,r} \exp(2\pi j \cdot r\tau_k/L), \tag{A3}$$

$$r = -1/2L \ldots 1/2L - 1$$

A2. Match Filtering

Match-filtering is carried out using spectral components of the source signature $\{s_i\}$, determined with the same window function. These components are given by:

$$S_r = \sum_{i=-1/2L}^{1/2L-1} s_i w_i \exp(2\pi j \cdot ri/L) \tag{A4}$$

The compressed composite signal is then given by:

$$C_r = F'_r S_r^*, \quad r = -\frac{1}{2}L \ldots \frac{1}{2}L-1, \tag{A5}$$

where * denotes conjugation.

$$c_i = 1/L \sum_{r=-1/2L}^{1/2L-1} C_r \exp(-2\pi j \cdot ri/L) \tag{A6}$$

At the centre of the window i=0, and $$c_0 = 1/L \sum_{r=-1/2L}^{1/2L-1} C_r \tag{A7}$$

Write:

$$F'_r = G'_r + jH'_r, \quad S_r = P_r + jQ_r, \quad C_r = A_r + jB_r, c_i = a_i + jb_i$$

Then from (A5)

$$C_r = A_r + jB_r = (G'_r P_r + H'_r Q_r) + j(-G'_r Q_r + H'_r P_r) \tag{A8}$$

Since the compressed pulse is real, $\{c_i\}$ can be replaced by $\{a_i\}$. Also Ar must be symmetric and Br antisymmetric in r. Hence from (A7):

$$a_0 = 1/L \left( A_0 + A_{1/2L} + \sum_{r=1}^{1/2L-1} 2A_r \right) \quad \text{(A9a)}$$

The required signal at each pixel is the instantaneous power in the complex envelope of the compressed pulse $\{c_i\}$. This envelope is obtained by replacing the $A_r$ with the $C_r$ in (A9) to get:

$$c_0 = 1/L \left( C_0 + C_{1/2L} + \sum_{r=1}^{1/2L-1} 2C_r \right) \quad \text{(A9b)}$$

with each $C_r$ given by (A8). The instantaneous power $E_0$ is then:

$$E_0 = c_0 c_0 *  \quad \text{(A10)}$$

As the centre of the time window traverses the echo, $a_0$, $c_0$ in (A9) give a signal related to the match-filtered response. For echoes which are delayed copies of the source, the FFT relationship (A5) only holds when the window is at least twice the pulse length and wholly contains it. As the compressed pulse leaves the window, the error gets worse. However $\{w_i\}$ can be designed to give a good approximation to the ideal match-filter response as the window traverses the source pulse. Note that the expected inverse Fourier Transform is not required.

A3. Reduced Filter Set

The processing load can be reduced by using only a subset of M Fourier spectral components $f_m$ chosen to span the signal bandwidth, and hence the echo bandwidth, as evenly as possible.

$f_0 = 0$ $f_m = r_m/L$, $f_{-m} = -r_m/L$ m=1 ... M

The DC component $f_0$ can be set to zero provided the window length is reasonably long, since hydroacoustic echo samples should average to zero. The Nyquist spectral component is also not required. Then Equations (A1,A2) become:

$$F_{k,m} = \sum_{i=-1/2L}^{1/2L-1} x_{k,i} w_i \exp(2\pi j \cdot f_{mi}) \quad \text{(A1a)}$$

$$F'_{k,m} = F_{k,m} \exp(2\pi j f_m \tau_k) \quad \text{(A2a)}$$

for m=-M ... M
And (9) becomes:

$$a_0 = 1/L \left( \sum_{m=1}^{M} 2A_m \right), c_0 = 1/L \left( \sum_{m=1}^{M} 2C_m \right) \quad \text{(A11)}$$

With this reduced set of spectral components, the choice of window function becomes more important both for accurate time-shifting, and for good match filtering, as the number of spectral components M is reduced.

APPENDIX B: TAYLOR SERIES APPROXIMATION TO TIME DELAY

When imaging in a frame of reference which moves with the sonar platform, it is possible to precompute a "Time-Delay Look-Up Table" giving the time delay between each pixel point in space and each transducer. If the frame of reference is fixed in space, and moves with respect to the platform, this precomputation does not appear to be feasible. We therefore look for an approximate computation of each time delay which is sufficiently cheap to execute in real time.

Assuming that the primary purpose of the sonar is side-scan survey, and bathymetric precision is secondary, the velocity of sound in the water column can be taken as constant, so that time delays are directly proportional to distances. It then simplifies the imaging computation if time delays are generated in units of the sampling period. Then the integer part of the time delay can be used directly to index through store to select the required in-phase and quadrature frequency components, while the fractional part can be used to phase shift these components, using the spectral frequency normalised by the sampling frequency. Conversion to the required units is easily built into the time-delay computation, and will be ignored in the following discussion.

Suppose that a coordinate system is defined which is fixed to the sonar platform, in fact with origin is at the centre of the sonar array of interest. In this coodinate system, consider a transducer with coordinates (u,v,w), and a pixel point in space with coordinates (U,V,W). The distance r from the transducer at (u,v,w) to the pixel point at (U,V,W) is given by:

$$r = \sqrt{((u-U)^2 + (v-V)^2 + (w-W)^2)} \quad \text{(B1)}$$

If we assume that u,v,w << R, where $R = \sqrt{(U^2 + V^2 + W^2)}$, then r can be expanded in the Taylor series:

$$\Delta r = R + \Lambda r,$$

where $$\Lambda r = -(Uu + Vv + Ww)R^{-1} + ((V^2 + W^2)u^2 + (W^2 + U^2)v^2 + (U^2 + V^2)w^2 + UV.uv + VW.vw + WU.wu)R^{-3} + \quad \text{(B2)}$$

R is simply the distance from the pixel point to the origin, or reference point on the array. The first term in B2 is the far-field approximation in which the differential delay to a given transducer is obtained by resolving the (u,v,w) coordinates along the radial line from the reference point to the pixel point in space. The second term is the quadratic approximation often used for dynamic focus computations.

In the time delay computation, the set $\{\Lambda r\}$ of differential delays between the origin and particular transducers is required with much greater accuracy than R itself, since an error in R merely displaces the pixel slightly in space, whereas the accuracy of the differential delays determine the sharpness of imaging focus. Also the r are much smaller. The Taylor series allows the two computations to be carried out with different precision. Incidentally a range search over a small interval can be carried out by varying R and leaving the $\{\Lambda r\}$ constant.

There is an important special case, mainly relevant to narrow-band arrays, where the receiver array is a 2D matrix of evenly spaced transducers, and all transducers lie in the plane w=0. Then for the transducer at (mD,0,nD), where D is the spacing $$\Lambda r(m,n) = -(Um + Wn)d + ((V^2 W^2)m^2 + (U^2 + V^2)n^2 + UW.mn)d^2/R \quad \text{(B3)}$$

Write $f = Ud = UD/R,$ $g = Vd = VD/R,$ $h = Wd = WD/R,$ \quad (B4)

to get:

$$\Lambda r(m,n) = -(fm + hn) + ((g^2 + h^2)m^2 + (f^2 + g^2)n^2 + fg.mn)/R$$

When carrying out the imaging computation, the parameters:

R,f,g,h,f/R,g/R (and in general h/R)   (B5)

need to be evaluated once for each pixel. A Cartesian-to-polar look-up table can be used to speed up various computations, including the one required here to generate R from U,V,W.

The quadratic expression Δr(m,n) needs to be evaluated once for each transducer. For a given m, the differential time delay between adjacent transducers, Δr(m,n+1)−Δr(m,n) is linear in n. Similarly for given n, the differential time delay is linear in m. This allows the set of time delays for any line of adjacent transducers to be generated rapidly. Essentially the same approximation is valid if the surface containing the set of transducers is a shallow dish, or quadratic surface.

The chirp situation requires a much smaller number of transducers, but no assumption can be made about their location; for example it could be an advantage to be able to position each transducer independently on the vehicle. In that case the expression (B2) needs to be evaluated for the (u,v,w) of each transducer, using a similar set of parameters to (B5).

I claim:

1. An acoustic imaging method comprising the steps of periodically transmitting wideband acoustic pulses to insonify a target area, detecting reflections of said pulses at a first set of at least two receiving positions using at least one receiver transducer to generate transducer output signals, and processing the transducer output signals corresponding to the set of receiving positions so as to produce an image of the target area, said processing step comprising:

(a) sampling said transducer output signals at a predetermined rate during an interval between the transmitted pulses;

(b) digitizing the sampled signals by an analog-to-digital conversion;

(c) quadrature match filtering the digitized sampled signal for each receiving position using a complex kernel derived from an estimated signature of each of the transmitted pulses, sampled at a same rate as the transducer output signals, so as to generate a set of complex filtered samples for each receiving position;

(d) taking, for each pixel in a required image, a weighted sum of selected phase-shifted complex filtered samples for the first set of receiving positions to form a complex composite signal by:

(i) selecting from said sets of complex filtered samples, samples whose echo times are closest to an estimated time of flight of the transmitted pulse to the point in the target area corresponding to the pixel and back to the transducer, and (ii) interpolating the selected complex samples by phase-shifting to compensate for a difference between required and selected time delays, wherein all phase-shifts are determined from the time differences using a single frequency.

2. The acoustic imaging method of claim 1, wherein the complex kernel used in step (c) is derived from the estimated signature, optimized for at least one of a shorter kernel length and a different compressed pulse shape.

3. The acoustic imaging method of claim 1, wherein the complex kernel used in step (c) is derived from the estimated signature, modified for a Doppler shift caused by relative movements of the transducer and a source of the reflections.

4. The acoustic imaging method of claim 1, wherein the single frequency used in step (d)(ii) for calculating phase shifts corresponds to a center frequency of the source pulse.

5. The acoustic imaging method of claim 1, wherein the wideband source pulse is of a balanced spectrum.

6. The acoustic imaging method of claim 1, wherein the source pulse comprises a linear swept-frequency chirp.

7. The acoustic imaging method of claim 1, wherein a plurality of receiver transducers are provided in an array, each transducer defining a respective receiving position.

8. The acoustic imaging method of claim 7, wherein a second set of receiving positions is defined by moving the transducer array between successive pulses, and samples received from said second receiving positions combined with those of the first set receiving positions to obtain a synthetic aperture image.

9. The acoustic imaging method of claim 1, wherein repeated imaging of a set of pixels derived from successive identical insonification pulses after lateral movement of the receiver transducer(s) is used to generate a phase-coherent synthetic aperture image by combination of the complex composite signals given for each pixel by step (d).

10. The acoustic imaging method of claim 1, further comprising the step of:

(e) generating a magnitude for each pixel by taking modulus of the complex composite signal given by step (d).

11. The acoustic imaging method of claim 10 wherein the repeated imaging of a set of pixels derived from successive, not necessarily identical, insonification pulses after lateral movement of the receiver transducer(s) is used to generate a non-coherent synthetic aperture image by a combination of the pixel magnitudes given by step (e).

12. The acoustic imaging method of claim 1, wherein the pulses are selected at frequencies and magnitudes transmittable in liquid.

13. An acoustic imaging apparatus comprising a transmitter for periodically transmitting wideband acoustic pulses to insonify a target area, at least one receiver transducer for detecting reflections of said pulses at a first set of at least two receiving positions to generate transducer output signals, and a processor for processing the transducer output signals corresponding to the first set of receiving positions to produce an image of the target region, said processor comprising:

a digitizer for sampling said transducer output signals at a predetermined rate during an interval between the transmitted pulses and digitizing the sampled signals by an analog-to-digital conversion;

a filter for quadrature match filtering the digitized sampled signal for each receiving position using a complex kernel derived from an estimated signature of one of the transmitted pulses, sampled at a same rate as the transducer output signals, so as to generate a set of complex filtered samples for each receiving position;

a signal compositor for taking a weighted sum of selected phase-shifted complex filtered samples to form a complex composite signal of each pixel in the required image, the signal compositor comprising (i) a selector for selecting from said sets of complex filtered samples, samples whose echo times are closest to an estimated time of flight of the transmitted pulse to the point in the insonified area corresponding to the pixel and back to the transducer, and (ii) an interpolator for interpolating the selected complex filtered samples by phase-shifting to compensate for a difference between required and selected time delays, all phase-shifts being determined from the time differences using a single frequency.

14. The acoustic imaging apparatus of claim 13, wherein said complex kernel is derived from the estimated signature, optimized for at least one of a shorter kernel length and a different compressed pulse shape.

15. The acoustic imaging apparatus of claim 13, wherein said complex kernel is derived from the estimated signature, modified for Doppler shift caused by a relative movement of the transducer(s) and a source of the reflections.

16. The acoustic imaging apparatus of claim 13, wherein the single frequency used by the signal compositor for calculating phase shifts corresponds to a center frequency of the source pulse.

17. The acoustic imaging apparatus of claim 13, wherein the wideband source pulse is of a balanced spectrum.

18. The acoustic imaging apparatus of claim 13, wherein the source pulse comprises a linear swept-frequency chirp.

19. The acoustic imaging apparatus of claim 13, wherein a plurality of receiver transducers are provided in an array, each transducer defining a respective receiving position.

20. The acoustic imaging apparatus of claim 19, wherein a second set of receiving positions is defined by moving the transducer array between successive pulses, and samples from said second set of receiving positions combined with those of the first set of receiving positions to obtain a synthetic aperture image.

21. The acoustic imaging apparatus of claim 13, wherein the repeated imaging of a set of pixels derived from successive identical insonification pulses after lateral movement of the receiver transducer(s) is used to generate a phase-coherent synthetic aperture image by a combination of the complex composite signals given for each pixel by step (d).

22. The acoustic imaging of claim 13, further comprises means for generating a magnitude for each pixel by taking a modulus of the complex composite signal given by the signal compositor.

23. The acoustic imaging apparatus of claim 22, wherein the repeated imaging of a set of pixels derived from successive insonification pulses after lateral movement of the receiver transducer(s) is used to generate a non-coherent synthetic aperture image by a combination of the pixel magnitudes given by said magnitude generating means.

24. The acoustic imaging apparatus of claim 13, wherein the signals are selected in frequencies and magnitudes transmittable in liquid.

25. The acoustic imaging method of claim 1, wherein the acoustic imaging method is performed for underwater search and survey.

26. The acoustic imaging method of claim 13, wherein the acoustic imaging method is performed for underwater search and survey.

* * * * *